United States Patent [19]
Kahler

[11] Patent Number: 5,023,796
[45] Date of Patent: Jun. 11, 1991

[54] FLIGHT CONTROL APPARATUS WITH PREDICTIVE HEADING/TRACK HOLD COMMAND

[75] Inventor: Jeffrey A. Kahler, Phoenix, Ariz.

[73] Assignee: Honeywell, Inc., Minneapolis, Minn.

[21] Appl. No.: 416,696

[22] Filed: Oct. 3, 1989

[51] Int. Cl.⁵ .................. G06F 15/48; G06F 15/50; G01C 21/00; G05D 1/10
[52] U.S. Cl. .................. 364/434; 364/443; 364/453; 244/179; 244/181
[58] Field of Search ............... 364/433, 434, 441, 443, 364/447, 453, 454; 244/175, 179, 181, 184

[56] References Cited

U.S. PATENT DOCUMENTS

| | | | |
|---|---|---|---|
| 3,809,867 | 5/1974 | Hattendorf | 364/434 |
| 3,824,381 | 7/1974 | Swern | 364/453 X |
| 4,312,039 | 1/1982 | Skutecki | 244/179 X |
| 4,343,035 | 8/1982 | Tanner | 244/175 X |
| 4,354,240 | 10/1982 | Olive | 364/434 |
| 4,371,939 | 2/1983 | Adams et al. | 364/434 |
| 4,664,052 | 5/1987 | Burns et al. | 364/447 X |

Primary Examiner—Parshotam S. Lall
Assistant Examiner—E. J. Pipala
Attorney, Agent, or Firm—Arnold L. Albin

[57] ABSTRACT

A flight path control apparatus for controlling an aircraft to execute a capture maneuver of a predetermined heading or track and provide a roll correction signal for controlling the path of said aircraft along an exponential transition curve. The corrective heading or track signal $\Delta\psi$ is generated in accordance with $$\Delta\psi = \frac{g}{V_t}\left[\frac{(\tau\dot{\phi}_i + \phi_i)ABS(\tau\dot{\phi}_i + \phi_i)}{2\phi_M} + \tau\dot{\phi}_i\right]$$

where
$\Delta\psi$ is the magnitude of the corrective heading or track command signal,
g is a constant corresponding to the acceleration of gravity,
$V_t$ is the true airspeed of the aircraft,
$\tau$ is a predetermined constant of aircraft roll rate,
$\phi_i$ is the roll angle of the aircraft at the initiation of the capture maneuver,
$\dot{\phi}_i$ is the time rate of change of the roll angle of the aircraft at initiation of the capture maneuver, and
$\dot{\phi}_M$ is a predetermined maximum time rate of change of roll rate of the aircraft during the capture maneuver.

The apparatus provides a predictive heading or track hold signal which avoids oscillation or overshoot in heading and roll when a hold mode is selected. The corrective heading or track command $\Delta\psi$ is combined with the initial roll angle of the aircraft to provide a roll attitude command signal $\psi p$ where $$\psi p = \phi i + \Delta\psi$$

to control the aircraft to execute the exponential transition path in capturing the predetermined heading or track.

11 Claims, 4 Drawing Sheets

FLIGHT CONTROL APPARATUS WITH PREDICTIVE HEADING/TRACK HOLD COMMAND

BACKGROUND OF THE INVENTION

1. Field of the Invention

The invention relates to aircraft flight path control apparatus particularly with respect to flight path control in the transition from a turn maneuver to heading/track hold.

2. Description of the Prior Art

Selection of heading or track modes for an aircraft is performed by the flight control panel. The panel is configured with various selector knobs and digital display windows for use by the pilot in manually selecting desired flight paths for autopilot or flight director control. Two of these flight paths are known as heading and track. When flying heading, the aircraft is commanded to point headin at a specific angle with respect to magnetic north. When controlled to track, the aircraft is commanded to fly in a specific terrestrial direction, regardless of crosswinds. In the absence of a crosswind, heading and track will follow an identical course under normal conditions.

The autopilot includes provision for a heading or track hold mode in which the desired direction will be maintained after execution of a turn maneuver. When the aircraft operator decides to terminate a turn maneuver and hold heading or track, it is desirable to display the new heading or track in the window of the control panel at the moment the heading or track hold mode is selected. This allows the operator to immediately visualize where the aircraft will be located before waiting for a roll-to-wings level maneuver to be completed. The prior art held the aircraft to the existing heading at the time the hold mode was selected. This resulted in an undesirable overshoot in heading and roll. The present invention provides a heading or track correction, based on the predicted path of the aircraft, with known inputs from the onboard navigation systems. The heading/track hold predict algorithm uses roll angle and roll attitude rate from an inertial reference system and estimated true airspeed from the flight control computer to predict the new heading or track which the aircraft will experience. The model used to develop the algorithm assumes the roll rate of the aircraft approaches a maximum roll rate exponentially with a predetermined time constant and then at some point in time approaches zero degrees of roll angle exponentially with the same predetermined time constant. The change in heading is based upon this assumed exponential path to wings level during a coordinated turn.

SUMMARY OF THE INVENTION

The foregoing disadvantages of the prior art are obviated by the present invention of apparatus for controlling an aircraft to execute a capture maneuver of a predetermined course along an exponential roll angle transisition curve. The present apparatus comprises means for providing a predetermined heading or track signal, means for generating a variable heading or track signal based on signals representative of aircraft roll angle, roll rate, and true airspeed for maintaining the aircraft on the exponential transition curve, and means for combining the reference signal and the variable heading or track signal to provide a predictive heading or track command signal for controlling the aircraft to capture said predetermined course upon completion of the exponential transition in a wings level attitude.

In the preferred embodiment of the invention, the heading or track predict signal is responsive to the existing roll angle of the aircraft and to the time rate of change of the existing roll angle. A first gain means is responsive to the roll angle rate signal and multiplies it by a predetermined time constant corresponding to a desired roll rate of change of the aircraft. The product signal and the roll rate signal are applied to a first summing means for deriving an algebraic sum thereof. The summed signal is applied to means for deriving its absolute value. The summed signal and the absolute value thereof are then multiplied to provide a further product signal. A second gain means is responsive to the product signal of the multiplier and to a factor inversely proportional to a predetermined maximum time rate of change of roll attitude of the aircraft and provides a signal corresponding to the product thereof. A third gain means is responsive to the existing roll angle of the aircraft and provides a signal proportional to the product of the roll angle with a factor corresponding to the above mentioned predetermined time constant of roll rate of change of the aircraft. A second summing means is responsive to the product signal provided by the second gain means and the signal generated by the third gain means to provide an algebraic sum thereof. A fourth gain means is responsive to the signal provided by the second summing means and a factor proportional to the value of the acceleration of gravity for providing a signal corresponding to the product thereof. This signal is applied as the numerator to a divider means, while the denominator is coupled to receive the true airspeed signal. A third summing means responds to a reference heading or track signal and the quotient signal produced by the divider means to generate an algebraic sum thereof. The algebraic sum signal constitutes a predictive command signal for energizing the automatic pilot apparatus to urge the aircraft to hold the reference heading or track signal corrected by the predictive command signal and maneuver the aircraft to a wings level roll attitude upon completion of the transition maneuver. In a like manner, the predictive command signal may be applied to a flight director for guiding manual control by a human pilot.

In the preferred embodiment, the apparatus for generating a predictive heading or track signal comprises means for generating a variable heading or track signal in accordance with the relationship:

$$\Delta \psi = \frac{g}{V_t} \left[ \frac{(\tau \dot{\phi}_i + \phi_i) ABS(\tau \dot{\phi}_i + \phi_i)}{2\phi_M} + \tau \dot{\phi}_i \right]$$

Further, the autopilot command signal provided by the means for combining the variable heading or track signal and the predetermined heading or track signal is denoted as $\psi p$ as follows:

$$\psi p = \psi i + \Delta \psi$$

where $\psi i$ is the predetermined heading or track signal and $\Delta \psi$ is the variable heading or track signal.

DESCRITPTION OF THE PREFERRED EMBODIMENT

Figure 1:
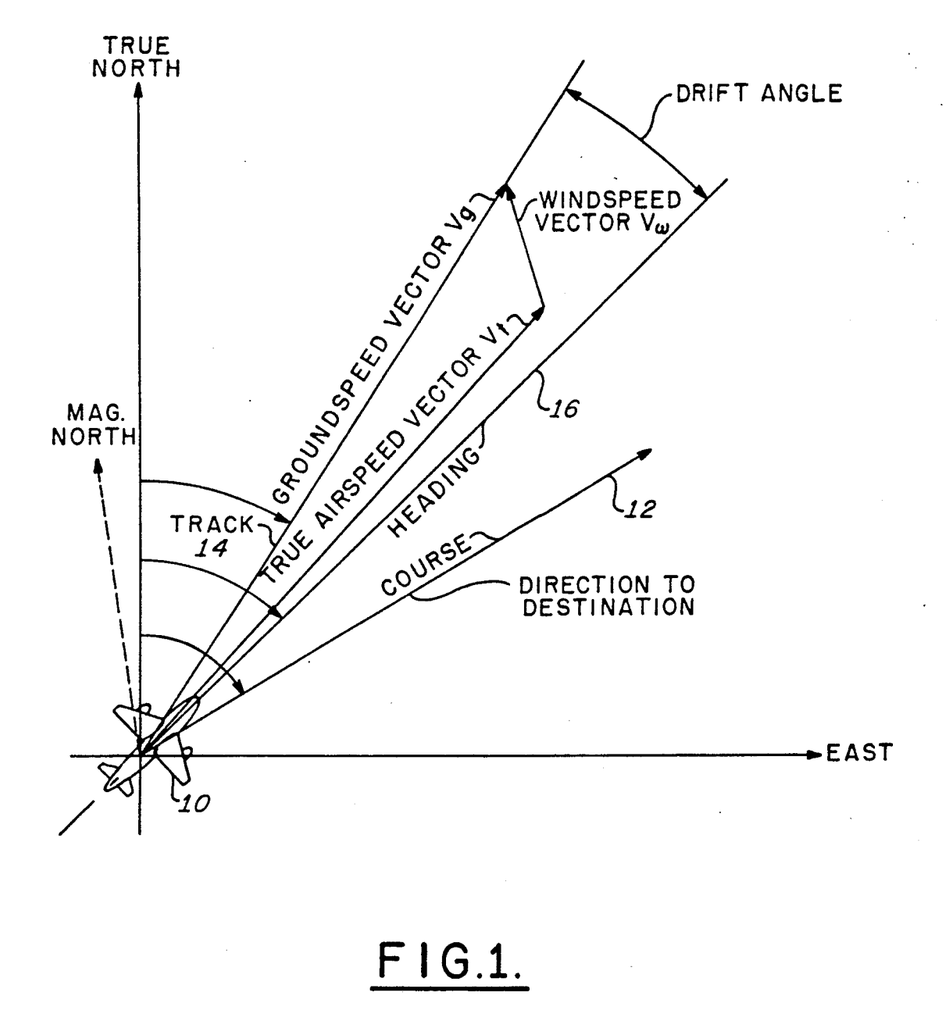
FIG. 1 illustrates the vectors and angular displacements necessary to describe the heading and track target courses flown by an aircraft.

The geometry of the situation may be better understood by reference to FIG. 1. A pilot determines his present location 10 and from a map determines the distance and direction to his destination 12. This direction to the destination is known as the "course." By reference to a directional reference, such as a magnetic compass, the aircraft is pointed in the desired direction 16 with respect to magnetic north, which is known as the "heading" of the aircraft. Since travel is not on land but through the air, and since the pilot is interested in his position with respect to places on the terrestrial surface, the movement of the air with respect to the surface of the earth or wind speed must be taken into consideration.

As the aircraft flies along under the influence of an air current, the direction of heading and movement will not coincide. The projection 14 of the direction of movement on the terrestrial sphere is known as the "track" and the angle between the heading 16 and the track 14 is known as the "drift angle". By taking into account a vector $V_w$ representing the direction and magnitude of the wind, the pilot may compute a drift angle correction to obtain a heading to be steered so that the "track made good" will substantially coincide with the course from the starting point to the destination.

It is appreciated that the desired result of the present invention is achieved by adding a heading or track correction signal to a heading/track reference signal to provide a predictive heading/track command as follows.

Figure 2:
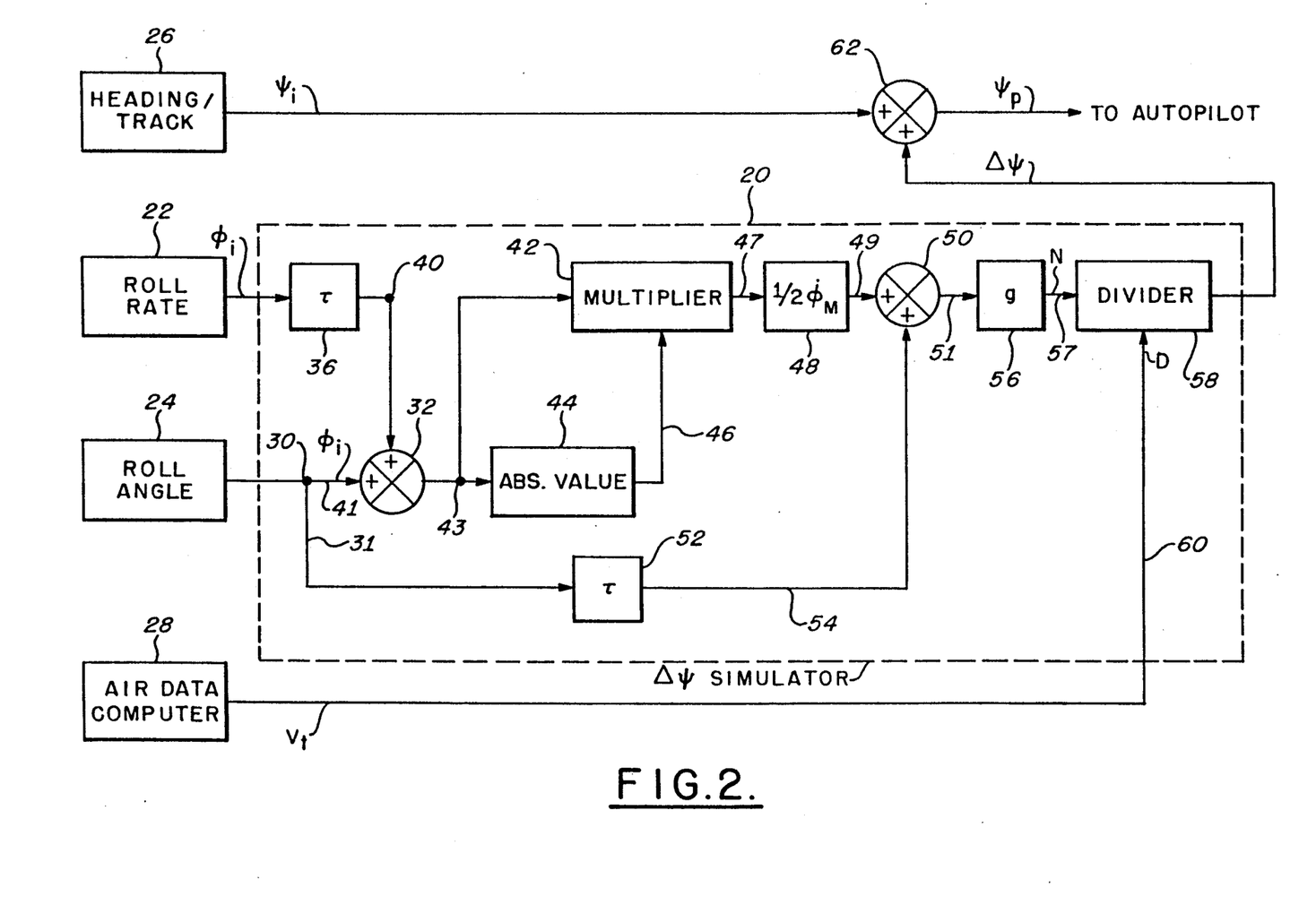
FIG. 2 is a functional block diagram of a predictive heading or track command simulator used in providing a heading or track command signal to an autopilot or flight director.

The information needed for the heading and track hold prediction function is generated by a heading/-track synthesizer, as shown in FIG. 2, which illustrates a schematic block diagram of an analog apparatus for generating a predict command in accordance with an algorithm to be described. The apparatus of FIG. 2 generates a predictive heading or track signal based on signals representative of aircraft roll attitude, roll rate, and true airspeed so as to maintain the aircraft on a desired exponential transition curve of a type to be described. A roll rate signal 22, roll angle signal 24 and heading/track signal 26 may be generated by an on-board inertial reference system (not shown) or may consist of separate vertical and directional gyroscope references slaved to long-term gravity and magnetic sensors which provide roll and heading information, respectively. In the latter case, the gyroscopic references are frequently provided as part of the autopilot.

In order to use the information from the reference system, it is conventionally introduced to individual roll, pitch, and yaw synchronizers. These derive error signals which are introduced to the inner loop for controlling the autopilot or flight director. The synchronizer provides a hold mode and a synchronize mode. In the hold mode, the input signal is clamped, thus establishing a reference position. Subsequent changes in the attitude or heading of the aircraft produce error signals that are introduced into the autopilot. In the roll axis, when the attitude-hold function is engaged in a turn, a "return to level" mode may be used to bring the aircraft wings level.

The basic airspeed reference is an airspeed sensor which may be part of an air data computer 28. The airspeed sensor is provided with means by which an airspeed selected by the pilot may be used as a reference, so that its output represents airspeed error relative to a desired airspeed.

Figure 6:
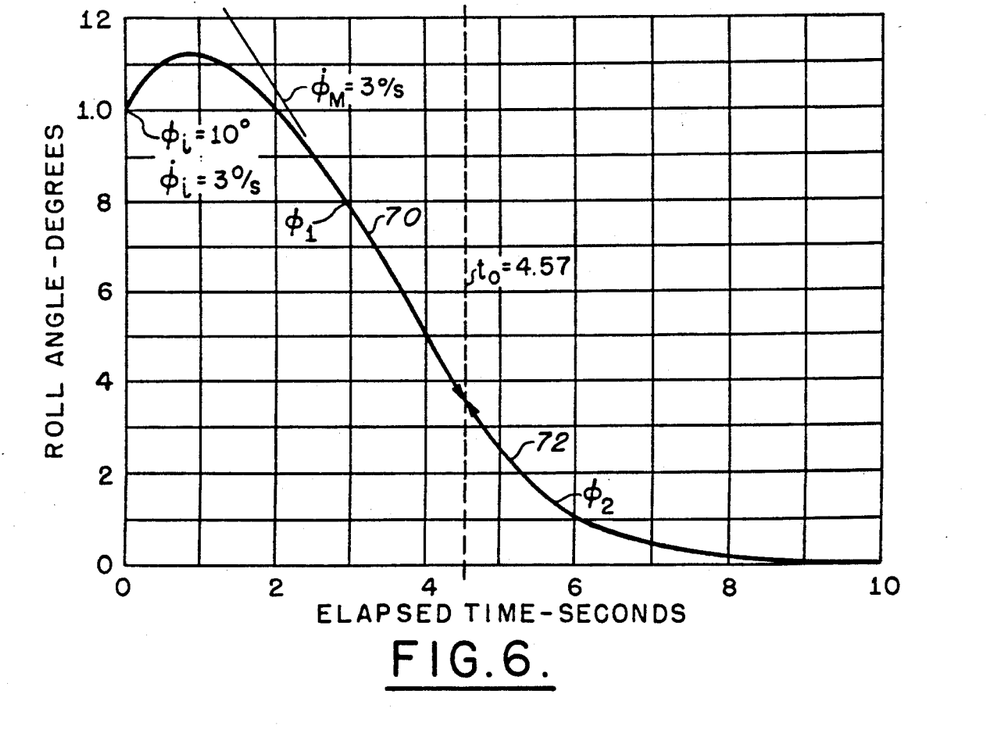
FIG. 6 is a curve showing the predicted path of the roll angle during a heading or track hold maneuver, illustrating the exponential transition curves corresponding to the predict algorithm.

The algorithm used to generate the specific predictive heading or track attitude signal utilized with an exponential transition path described will now be derived. The concepts in the development of the predict curve are as follows. Referring to FIG. 6, the total transition curve is comprised of curves 70 and 72. The ordinate depicts the roll angle $\phi$ in degrees while the abscissa shows elapsed time t in seconds from initiation of the hold maneuver. Curve 70 transitions to curve 72 at a computed time $t_0$. At the moment the hold mode is engaged, curve 70 has an initial value equal to the aircraft roll angle $\phi_i$. Correspondingly, the derivative of curve 70 has a value equal to the initial roll rate $\dot{\phi}_i$ at the moment of mode engagement. A predetermined time constant $\tau$ representative of the exponential decay of curve 70 is assigned, based on the aircraft turning performance specifications, which in turn is based on aircraft characteristics and passenger comfort. Similiarly, a maximum displacement rate $\dot{\phi}_m$ is assigned to curve 70. The derivative of curve 70 is then defined to start at $t=0$ and lag to $t=t_0$ at the specified time constant. This defined curve is integrated to form curve 70 with the initial conditions set to $\dot{\phi}_i$. Curve 72 is an exponential lag to zero with the initial condition of the value of curve 70 at time $t_0$. To calculate $t_0$ a simultaneous set of equations must be solved. The first set of equations will equate curve 70 to curve 72. The second set of equations equates the derivative of curve 70 to the derivative of curve 72. From these two equations, the two unknowns, time and magnitude, may be solved. The time constant $\tau$ and maximum roll rate $\dot{\phi}_m$ are determined so that the wings level maneuver is performed as quickly as possible without compromising passenger comfort. Suitable values for these parameters are described below.

The differential equation of the desired exponential transition path of curve 70 is:

$$\ddot{\phi}_1 = C_i \theta^{-t/\tau} \tag{1}$$

where $\ddot{\phi}_1$ is the derivative of roll rate for curve 70, $C_1$ is a constant, t is elapsed time, and $\tau$ is a predetermined time constant.

By integrating $\ddot{\phi}_1$, and substituting the initial conditions for $t=0$ and as $t \to \infty$ then $\dot{\phi}_1 = \dot{\phi}_i$ and $\dot{\phi}_1 \to \dot{\phi}_m$ where $\dot{\phi}_i$ is the initial roll rate at hold mode engagement, and $\dot{\phi}_m$ is the maximum allowable roll rate at hold mode engagement, we obtain $$\dot{\phi}_1 = (\dot{\phi}_i - \dot{\phi}_m)e^{-t/\tau} + \dot{\phi}_m \quad (2)$$

But at the time of hold mode engagement t=0 and $\phi_1 = \phi_i$ so integrating $\dot{\phi}$ yields $$\phi_1 = \tau(\dot{\phi}_m - \dot{\phi}_i)(e^{-t/\tau} - 1) + \dot{\phi}_m t + \phi_i \quad (3)$$

Referring again to FIG. 6, curve 72 is a simple exponential lag to 0, hence $$\phi_2 = Ae^{-(\frac{t-t_0}{\tau})} \quad (4)$$

and $$\dot{\phi}_2 = -\frac{A}{\tau}e^{-(\frac{t-t_0}{\tau})} \quad (5)$$

where $\dot{\phi}_2$ is the roll rate of curve 32 and A is a constant. The value of constant A at transition time $t_0$ may be calculated with a knowledge that at $t=t_0$, $$\phi_1 = \phi_2 = A \text{ and } \dot{\phi}_1 = \dot{\phi}_2 \quad (6)$$

Setting equation (2) equal to equation (5) and equation (3) equal to equation (4) and solving for $t_0$ yields $$t_0 = -(\dot{\phi}_i \tau + \phi_i)/\dot{\phi}_m \quad (7)$$

where $\dot{\phi}_m$ is defined as $$\dot{\phi}_m = -|\dot{\phi}_m| \text{SIGN}(\dot{\phi}_i t + \phi_i) \quad (8)$$

where the expression SIGN $(\dot{\phi}_i t + \phi_i)$ denotes the algebraic sign of the expression in brackets. This provision assures that $t_0$ always has a positive value.

Solving for A yields $$A = \tau\{(\dot{\phi}_m - \dot{\phi}_i)\exp[(\phi_i + \dot{\phi}_i \tau)/\tau\dot{\phi}_m] - \dot{\phi}_m\} \quad (9)$$

To derive the change in heading expression from the modelled roll angle curve 70, 72, a turn coordination function is included to assure that the track performance which results from the predict computation is accurate. The implementation of this function is performed by computing a yaw rate $\dot{\psi}$ which is derived from the roll angle $\phi$ and aircraft velocity $V_t$. The resultant commanded yaw rate is expressed as $$\dot{\psi} = \frac{g \sin\phi}{V_t \cos\phi} \quad (10)$$

where g is the acceleration of gravity. For small angles (e.g., less than 30°)

$$\dot{\psi} = g\phi/V_t \quad (11)$$

The change in heading or track during a coordinated turn, denoted by $\Delta\psi$ is $$\Delta\psi = \int_{t=0}^{\infty} g\phi/V_t \, dt \quad (12)$$

Assuming that the true airspeed $V_t$ remains constant during the turn $$\Delta\psi = g/V_t \int_{t=0}^{\infty} \phi \, dt = g/V_t \left[ \int_{t=0}^{\infty} \phi_1 dt + \int_{t=0}^{\infty} \phi_2 dt \right] \quad (13)$$

For convenience in reference, the above may be rewritten as $$\Delta\psi = \Delta\psi_1 + \Delta\psi_2 \quad (14)$$

Integrating the above expressions results in $$\Delta\psi_1 = g/V_t \int_{t=0}^{t_0} \phi_1 dt \quad (15)$$

and $$\Delta\psi_2 = g/V_t \int_{t=t_0}^{\infty} \phi_2 dt \quad (16)$$

Summing equations (15) and (16) results in $$\Delta\psi = \frac{g}{V_t}\left[\frac{(\tau\dot{\phi}_i + \phi_i)^2}{-2\dot{\phi}_M} + \tau\dot{\phi}_i\right] \quad (17)$$

Note that the sign of $\dot{\phi}_M$ must be taken such that the solution for $t_0$, the time of transition between curves 70 and 72, is a positive number. Equation 17 may be simplified to result in the following expression which represents the magnitude of the change in roll angle and where the sign of $\dot{\phi}_m$ need no longer be considered.

$$\Delta\psi = \frac{g}{V_t}\left[\frac{(\tau\dot{\phi}_i + \phi_i)ABS(\tau\dot{\phi}_i + \phi_i)}{2\dot{\phi}_n} + \tau\dot{\phi}_i\right] \quad (18)$$

Equation (18) defines the variable heading or track signal $\Delta\psi$ which when added to the corresponding predetermined heading or track reference signal $\psi_i$ satisfies the desired exponential capture maneuver and provides a predict signal $\psi_p$ representative of the predicted heading or track attitude. The new predicted heading then is $$\psi_p = \psi_i + \Delta\psi \quad (19)$$

It is appreciated from the foregoing that the equation (18) represents a family of exponential curves parameterized in accordance with the time constant $\tau$, the initial roll angle $\phi_i$, and the maximum roll rate $\dot{\phi}_m$.

Referring again to FIG. 2, the apparatus therein generates a predictive heading or track command signal in accordance with equation (19) defined above. A signal $\psi_i$ is provided from roll angle block 24 in accordance with the roll angle of the aircraft at the moment of the heading or track mode initiation where it is coupled to one input of a first summing junction 32. A signal $\dot{\phi}_i$ is provided by roll rate 22 to gain block 36 in accordance with the initial roll rate of the aircraft. Gain block 36 multiplies the applied signal by a predetermined gain factor $\tau$ corresponding to a desired roll rate time constant and applies it to a second input of summing junction 32. The gain-scaled roll rate signal $\tau\dot{\phi}_i$ at lead 40 is coupled to a second input of summing junction 32 where it is algebraically combined with the roll angle signal $\phi_i$ on lead 41 and applied to node 43 and to absolute value taker 44. The output of absolute value taker 44 is applied on lead 46 to multiplier 42 which generates a product of the summed roll rate signal $\tau\dot{\phi}_i$ and roll angle signal $\phi_i$ and absolute value of the summed signals applied thereto. The output from multiplier 42 therefore is a signal representative of the factor $$\tau(\dot{\phi}_i+\phi_i)ABS(\tau\dot{\phi}_i+\phi_i) \tag{20}$$

The output from the multiplier 42 is applied as an input to gain block 48 which multiplies the applied input signal on lead 47 by a factor of $\frac{1}{2}\dot{\phi}_m$. The output of gain block 48 is applied as one input to a second summing junction 50. The roll angle signal at node 30 is applied on lead 31 to a further gain block 52. The time constant $\tau$ is provided by block 52 as a gain factor for multiplication with the roll angle signal $\phi_i$. The output of gain block 52 is applied on lead 54 to a second input of second summing junction 50 where it is algebraically combined with the output on lead 49 of gain block 48. The signal on lead 54 represents the factor $\tau\phi_i$. The combined signal from second summing junction 50 is coupled on lead 51 to gain block 56 which multiplies it by a factor g, the acceleration of gravity. The output thereof is applied on lead 57 as the numerator N to an algebraic divider 58. Divider 58 also receives as its denominator D on lead 60 the signal $V_t$, the true airspeed of the aircraft, from air data computer 28.

Divider 58 provides the quotient of the gain scaled input from gain block 56 and the true air speed of the aircraft from air data computer 28 to generate the heading or track predict command $\Delta\psi$ as in equation (18).

A predetermined heading/track reference signal $\psi_i$ manually entered by the pilot in block 26 is applied to a third summing junction 62. Summer 62 receives as a second input the predict command signal $\Delta\psi$ from divider 58. The applied signals are algebraically summed in third summing junction 62 to provide the signal $\psi_p$ as in the equation $$\psi_p=\psi_i+\Delta\psi \tag{21}$$

The signal $\psi_p$ may then be directed to the autopilot or flight director.

The blocks 22, 24, 26, and 28 providing the respective signals $\dot{\phi}_i$, $\phi_i$, $\psi_i$, $V_t$ are conventional components well known in the flight control art. Roll rate 22 may be implemented by any one of a large number of well known rate detectors or rate takers utilized in the art. Roll angle 24 may be implemented by any one of the large number of roll attitude sensors utilized in the art as, for example the roll portion of a conventional vertical gyroscope. The heading/track input may be generated by a conventional heading/track-hold synchronizer. The air data signal in block 28 may be derived from a conventional air data computer using any of a large number of well known air data sensors.

It will be appreciated that the apparatus of FIG. 2 may be implemented by discrete analog circuitry as shown or by equivalent digital circuitry, or by programming a general purpose programmable digital computer. It will further be appreciated that mathematical terms equivalent to those delineated above may be utilized in implementing embodiments of the present invention.

Additionally, it is appreciated that by appropriately varying the time constant $\tau$ in the predict equation, a family of exponential curves is defined, all asymptotically approaching a wings level attitude, but each with a different time constant. Thus, by utilizing the present invention it is possible to control the asymptotic path time constant $\tau$ to generate a predict path consistent with maximum allowable bank limits.

In operation, the heading/track hold mode provides servo and/or flight director commands to maneuver or guide the aircraft to hold an existing aircraft heading or track or to capture and hold a heading or track presented on the flight control panel. The heading hold mode is the basic roll mode of the autopilot and flight director.

For example, when the autopilot is engaged, upon engagement of heading hold mode the autopilot automatically maneuvers the aircraft to hold the aircraft heading within a given error of the reference heading, typically of the order of plus or minus 1.0°. The reference heading is the heading existing when the heading hold mode is activated plus or minus a predicted value to allow a smooth capture. The autopilot rolls the aircraft towards wings level and holds the reference wings level heading. In the present invention, roll rates during heading maneuvers are limited to 2° or 3° per second depending on conditions or less and are limited to 2° per second after the reference has been captured, with a roll rate constant of about 1.24 seconds.

Upon engagement of the track hold mode, the autopilot automatically maneuvers the aircraft to hold the aircraft track, typically within plus or minus 1.0° of the reference track. The reference track is the track heading existing when the track hold mode is activated plus or minus a predicted value to provide a smooth capture. The autopilot rolls the aircraft towards a wings level attitude and holds the reference wings level track. Roll rates during track hold maneuvers are limited to 2° or 3° per second or less depending on conditions and are limited to 2° per second after the reference has been captured.

In a similar maneuver, the human pilot may utilize the flight director and control panel to visualize the predicted heading or track and manually control the aircraft to a wings level attitude without oscillation or overshoot.

Figure 3:
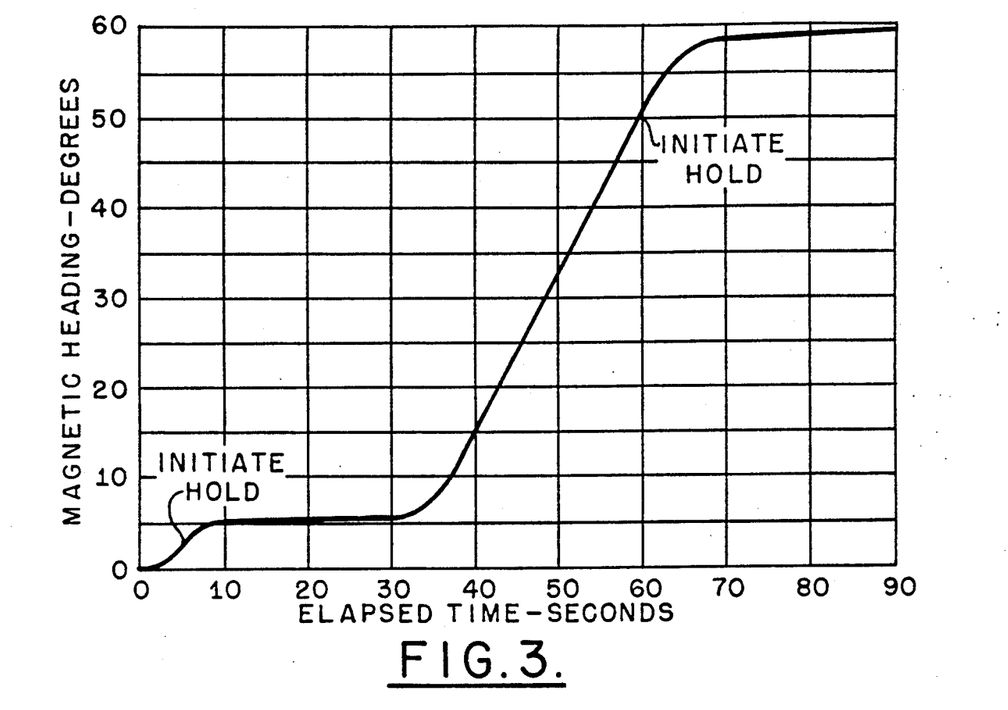
FIG. 3 is a curve showing typical results of a heading hold maneuver utilizing the predictive command of the present invention.

The operation of the invention may be more readily understood by reference to FIGS. 3-6. FIG. 3 shows the results of a simulation test of a heading hold maneuver. Heading hold was engaged at 5 seconds elapsed time from a heading change maneuver and it is seen that the heading approaches a constant value of 5° magnetic with no overshoot or undershoot. At 60 seconds elapsed time, a new heading hold was selected and a constant value of 60° approached with no overshoot.

Figure 4:
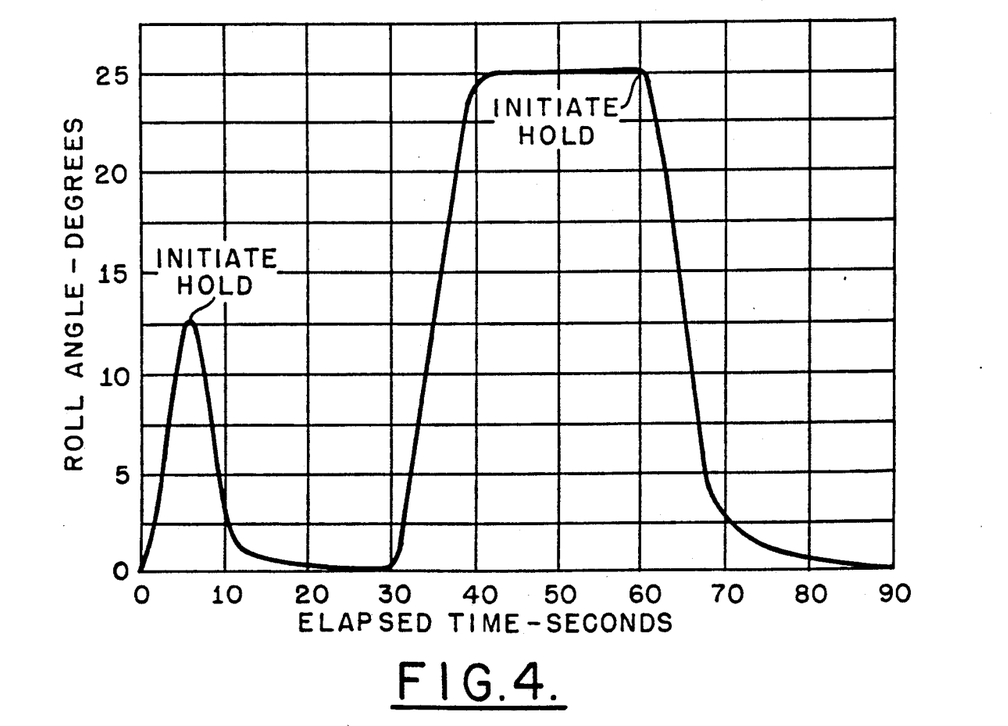
FIG. 4 is a curve showing changes in roll angle as a function of the heading hold maneuver illustrated in FIG. 3.
Figure 5:
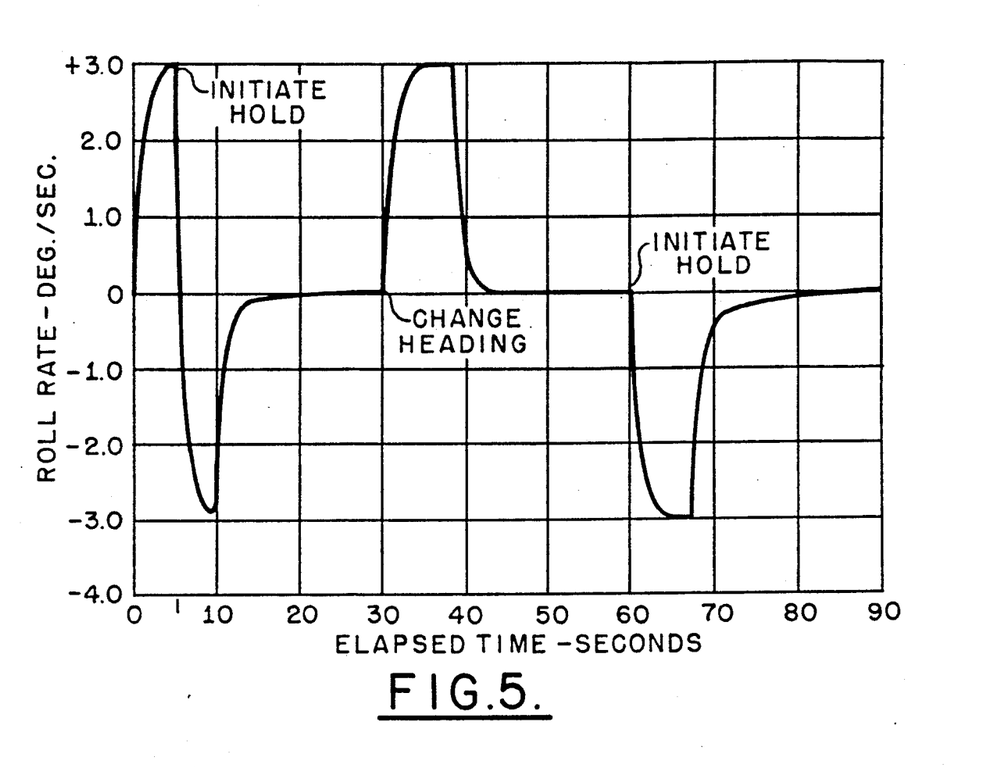
FIG. 5 is a curve showing the changes in roll rate as a function the heading hold maneuver of FIG. 3.

Referring now to FIG. 4, the corresponding roll angle with respect to the headings selected in FIG. 3 is shown. Heading hold was initiated at elapsed time of 5 seconds and a roll angle of 12.5°. It may be seen that the aircraft rolls out to a wings level position (0°) within about 15 seconds. A new heading was selected at 30 seconds; when heading hold was selected at 60 seconds and an initial roll angle of 25°, the aircraft settled out to a roll angle of 0° within 30 seconds ( elapsed time 90 seconds.) FIG. 5 shows the roll rates achieved during the prior maneuvers. Heading hold was selected at 5 seconds and at an initial roll rate of 3.0° per second. The aircraft rolled at a negative rate to −3.0° per second from a roll angle of 12.5° to a rate of 0° per second at an elapsed time of about 15 seconds from hold initiate. The second case, where the hold was initiated at 60 seconds, rolled out from a roll angle of 25° and a roll rate of 0° from a new heading selected at 30 seconds to set up this second turn.

When in the track predict mode, the operation is similar to that in the heading mode.

Referring now to FIG. 6, the predicted path of roll angle is shown during a heading or track hold maneuver. In this example, the roll angle at initiation of the hold mode is 10°, while the initial roll rate is 3° per second. The maximum roll rate is predetermined at 3° per second with a time constant of 1.24 seconds. For a true airspeed of 400 ft/sec, with the parameters assumed as above, the predicted change in heading is 3.52°. It is noted that the change in roll angle to wings level attitude is achieved asymptotically without oscillation and without overshoot.

While the invention has been described in its preferred embodiments it is to be understood that the words which have been used are words of description rather than limitation and that changes may be made within the purview of the intended claims without departing from the true scope and spirit of the invention in its broader aspects.

Embodiments of an invention in which an exclusive property or right is claimed are defined as follows:

1. Flight path control apparatus for controlling an aircraft to execute a capture maneuver of a predetermined course along an exponential roll angle transition curve comprising:
   means for providing a predetermined heading or track signal,
   means for generating a variable heading or track signal based on signals representative of aircraft roll attitude, roll rate, and true airspeed, for maintaining said aircraft on said exponential transition curve, and means for combining said predetemined heading or track signal and said variable heading or track signal to provide a predictive heading or track command signal for controlling said aircraft to capture said predetermined course upon completion of said exponential transition in a wings level attitude.

2. Flight path control apparatus for controlling an aircraft to execute a capture maneuver of a predetermined course along an exponential roll angle transition curve comprising:
   means for providing a predetermined heading or track signal,
   means for generating a variable heading or track signal based on signals representative of aircraft roll attitude, roll rate, and true airspeed, for maintaining said aircraft on said exponential transition curve, and
   means for combining said predetermined heading or track signal and said variable heading or track signal to provide a predictive heading or track signal for controlling said aircraft to capture said predetermined course in a wings-level attitude upon completion of said exponential transition,
   wherein said means for generating a variable heading or track signal comprises means for generating said signal in accordance with the relationship $$\Delta \psi = \frac{g}{V_t} \left[ \frac{(\tau\dot{\phi}_i + \phi_i)ABS(\tau\dot{\phi}_i + \phi_i)}{2\dot{\phi}_M} + \tau\dot{\phi}_i \right]$$

where $\Delta\psi$ is the magnitude of said variable heading or track signal, g is a constant corresponding to the acceleration of gravity, $V_t$ is the true airspeed of the aircraft, $\tau$ is a predetermined constant of aircraft roll rate, $\phi_i$ is a roll angle of the aircraft at the initiation of said capture maneuver, $\dot{\phi}_i$ is a time rate of change of said roll angle of the aircraft at initiation of said capture maneuver, and $\dot{\phi}_m$ is a predetermined maximum time rate of change of roll rate of said aircraft during said capture maneuver.

3. The flight path control apparatus of claim 2 in which said means for combining said predetermined heading or track signal and said variable heading or track signal comprises means for providing said predictive heading or track command signal in accordance with the relationship $$\psi_p = \psi_i + \Delta\psi$$

where $\psi_p$ is said predictive heading or track command signal, $\psi_i$ is said predetermined heading or track signal, and $\Delta\psi$ is said variable heading or track signal.

4. The flight path control apparatus of claim 2 wherein said exponential transition curve is comprised of a function of differences of roll angle time rate of change with respect to said predetermined maximum time rate of change of roll angle, of a function of the time elapsed following initiation of said capture maneuver; and of a function of a sum with said predetermined maximum time rate of change of roll rate of said aircraft during said capture maneuver.

5. The flight path control apparatus of claim 4, wherein said exponetial transistion curve is further comprised of a product of said predetermined maximum time rate of change of roll angle and said time elapsed following initiation of said capture maneuver, and further comprised of a sum of said product and said roll angle of said aricraft at the initiation of said capture maneuver.

6. The flight path control apparatus of claim 5, wherein said exponential transition curve comprises means for generating a corrective aircraft roll signal in accordance with the relationship $$\Phi_1 = \tau(\dot{\Phi}_M - \dot{\Phi}_i)(e^{-t/\tau} - 1) + \dot{\phi}_M t + \phi_i$$

where $\Phi_1$ is a roll angle corresponding to a first portion of said transition curve, $\tau$ is a predetermined time constant of roll rate, $\dot{\Phi}_M$ is a predetermined maximum roll rate at initiation of the capture maneuver, $\Phi_i$ is a roll angle at the initiation of the capture maneuver, $\dot{\phi}_i$ is a roll rate at the initiation of the capture maneuver, and t is the elapsed time following initiation of the capture maneuver.

7. The flight path control apparatus of claim 6, wherein said exponential transition curve is further comprised of a function of the value of the roll angle of said aircraft at said time elapsed after the initiation of said capture maneuver and said predetermined time constant of aircraft roll rate.

8. The flight path control apparatus of claim 7, wherein said exponential transition curve comprises means for generating an aircraft roll corrective signal in accordance with the relationship $$\phi_2 = -Ae^{-(\frac{t-t_o}{\tau})}$$

where $\phi_2$ corresponds to the roll angle of a second portion of said transition curve, A is a function of roll angle at a predetermined elapsed time interval, $t_o$ is an elapsed time interval corresponding to the transition point between said first and second portions of said transition curve, t is a measure of the elapsed time, and $\tau$ is a predetermined time constant characterizing the roll rate of the aircraft as it approaches said predetermined maximum roll rate of the aircraft.

9. Flight path control apparatus for controlling an aircraft to execute a capture maneuver of a predetermined course along an exponential roll angle transition curve comprising:

means for providing a reference heading or track signal, means responsive to the existing roll angle of said aircraft for providing a signal representative thereof, means responsive to the time rate of change of said existing roll angle of said aircraft for providing a signal representative thereof, means for providing a velocity signal in accordance with the true airspeed of said aircraft, first gain means responsive to said signal representative of the time rate of change of said existing roll angle of said aircraft for providing a signal proportional to the product thereof with a factor corresponding to a predetermined time constant of aircraft roll rate of change, first summing means responsive to said signal from said first gain means and said signal representative of an existing roll angle for providing a signal corresponding to an algebraic sum thereof, means responsive to said algebraic sum signal of said first summing network for deriving a signal corresponding to an absolute value thereof, multiplier means responsive to said summed signal of said first summing network and said absolute value signal for providing a signal corresponding to a product thereof, second gain means responsive to said product signal of said multiplier means and to a factor inversely proportional to a predetermined constant representative of a predetermined maximum time rate of change of roll attitude of said aircraft for providing a signal corresponding to the product thereof, third gain means responsive to said signal corresponding to an existing roll angle of said aircraft for providing a signal proportional to the product thereof with a factor corresponding to said predetermined time constant of aircraft roll rate of change, second summing means responsive to said product signal provided by said second gain means and said signal provided by said third gain means for providing a signal corresponding to an algebraic sum thereof, fourth gain means responsive to said signal provided by said second summing means and a factor proportional to the value of the acceleration of gravity for providing a signal corresponding to the product thereof, divider means for generating a path control signal corresponding to the quotient of said signals provided by said fourth gain means and said means for providing a velocity signal, and third summing means responsive to said reference heading or track signal and said path control signal for providing an algebraic sum thereof, said signal produced by said third summing means providing a predictive command signal for energizing said flight path control apparatus to urge said aircraft to hold said reference heading or track signal corrected by the path control signal and maneuver said aircraft to a wings level roll attitude.

10. A method for driving an automatic pilot apparatus for controlling an aircraft to execute a capture maneuver of a predetermined course along an exponential transition curve comprising:

providing a signal representative of a desired heading or track, providing a signal corresponding to an existing roll attitude of said aircraft, providing a signal corresponding to a roll rate of said aircraft, providing a velocity signal corresponding to the true airspeed of said aircraft, applying said roll attitude signal and said roll rate signal to means responsive to a predetermined constant representative of a time constant of said roll rate and responsive to a predetermined maximum roll rate of said aircraft to generate a corrective heading or track signal of the form $$\Delta\psi = -\frac{g}{V_t}\left[\frac{(\tau\dot{\phi}_i + \phi_i)ABS(\tau\dot{\phi}_i + \phi_i)}{2\phi_M} + \tau\dot{\phi}_i\right]$$

and sub new para forming an algebraic sum of said desired heading or track signal and said corrective heading or track signal to produce a heading or track command signal corresponding to a resultant heading or track attitude when the aircraft has attained a wings level position after execution of said capture maneuver.

11. The method as set forth in claim 10, wherein said means to generate a predictive heading or track signal comprises a programmed digital computer.

* * * * *